Figure 1:
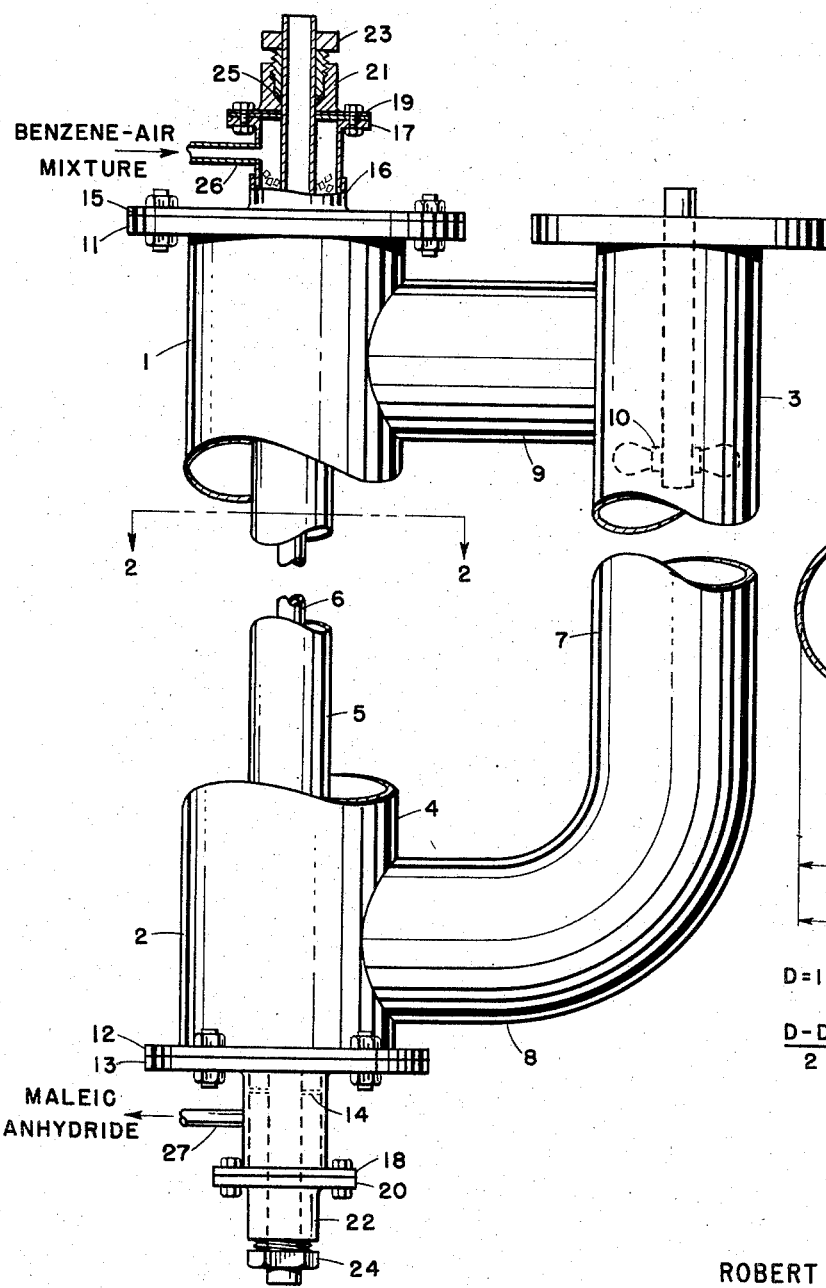

May 5, 1959

R. C. RYDER 2,885,409

MALEIC ANHYDRIDE PRODUCTION AND CATALYST THEREFOR

Filed May 27, 1957

$D = 1 - 2\frac{1}{2}$ IN.

$\dfrac{D-D'}{2} = \dfrac{3}{8} - 1$ IN.

INVENTOR.
ROBERT C. RYDER
BY
Wm. P. Spielman
ATTORNEY

United States Patent Office 2,885,409
Patented May 5, 1959

2,885,409

MALEIC ANHYDRIDE PRODUCTION AND CATALYST THEREFOR

Robert C. Ryder, Library, Pa., assignor to American Cyanamid Company, New York, N.Y., a corporation of Maine Application May 27, 1957, Serial No. 661,817

5 Claims. (Cl. 260—346.8)

This invention relates to improvements in the vapor phase catalytic oxidation of mononuclear aromatic compounds to maleic anhydride by the passage of vapors thereof in admixture with an oxygen-containing gas in contact with a suitable oxidation catalyst. The invention includes the improved oxidation methods and apparatus, the utilization of vanadium oxide-molybdenum oxide catalysts in the reaction and certain new catalysts of this class as will be hereinafter more fully described.

The production of maleic anhydride vapors by the catalytic oxidation of mononuclear aromatic compounds is well known, and has been practiced on a commercial scale for many years. Ordinarily such aromatic hydrocarbons as benzene, toluene, cymenes and the like and other mononuclear aromatic compounds such as phenols and cresols have been used, but it is known that practically any mononuclear aromatic compound that is capable of vaporization can be oxidized in the vapor phase with the formation of maleic anhydride vapors when suitable reaction temperatures are employed. The most widely used catalysts in this reaction are those which contain oxides of vanadium as a principal catalytic ingredient; these oxides are usually coated on or impregnated into a support. The catalyst is filled into a tubular converter containing small (0.6 inch inside diameter) tubes surrounded by a bath of a heat-removing liquid and vapors of the aromatic compound in admixture with air or other oxidizing gas are passed through the tubes. In commercial converters of this type, 6 feet in diameter, operating with benzene-air mixtures the yields are on the order of 60–70 lbs. of maleic anhydride for each 100 lbs. of benzene charged, with bath temperatures of about 460°–500° C., 1.2–1.5 mole percent benzene-air mixtures and loadings of about 40–50 grams of benzene per hour per tube.

It is a principal object of my present invention to provide improvements in the above described process for the production of maleic anhydride which will permit increased catalyst loadings and higher conversion yields of maleic anhydride than have heretofore been obtainable under commercial operating conditions. A further and more particular object is to provide a method of operation of vanadium oxide-molybdenum oxide catalysts in this process in such a manner that the aforesaid improved results are obtainable without loss of molybdenum oxides from the catalyst through volatilization. Still further objects will be evident from the following description of preferred embodiments of the invention when taken with the appended claims.

As is stated above, catalysts containing oxides of vanadium are in wide commercial use for the production of maleic anhydride by the vapor phase catalytic oxidation of mononuclear aromatic compounds. I have investigated a wide variety of such vanadium oxide-containing catalysts in this process, and have found that those which contain molybdenum oxide together with vanadium oxides are highly effective for the purpose. I also found, however, that when such catalysts are used in the ordinary tubular converters described above, with bath temperatures of 460°–500° C. and higher, there is a progressive loss of molybdenum oxide from the catalyst through volatilization. These losses increased as the catalysts were tested at higher loadings, due to the increasing temperatures of the hot spot in the catalyst.

It is well known that in catalytic processes of the type in question the internal temperature of the catalyst at the area where the reaction is most vigorous may be some 50° or more higher than the bath temperatures, and that with increased loadings these hot spot temperatures may be as much as 80°–100° C. higher than the bath temperature. It was evident that molybdenum oxide was being volatilized from the catalyst at these high internal temperatures. Thus, when a plant converter was operated with a vanadium oxide-molybdenum oxide catalyst with a bath temperature of 500° C., 1.2–1.5 mole percent of benzene feed and a loading of 500 liters of gas mixture per hour it was found that 50% of the molybdenum was lost after 6 months of operation.

I then found that by arranging the vanadium oxide-molybdenum oxide catalysts in the form of a relatively narrow annulus, surrounded by and in heat-exchanging relation with the temperature-regulating liquid, the operating temperatures of the catalysts could be reduced to such an extent that volatilization of molybdenum oxides therefrom is substantially completely avoided, while still obtaining high yields of maleic anhydride at high production capacities. In fact, I found that under these conditions the average yield of maleic anhydride from benzene could be increased to about 70 lbs. for each 100 lbs. of benzene charged when the converter was operated in such a manner that unconverted benzene was present in the exit gases. In other words, I have found that both greater throughputs of vaporized aromatic compound and higher conversion yields of maleic anhydride can be obtained with vanadium oxide-molybdenum oxide catalysts when these catalysts are maintained in the form of narrow annuli surrounded by a heat-removing bath, are operated at bath temperatures considerably lower than those heretofore regarded as being suitable for this type of reaction, and are deliberately overloaded so that unconverted aromatic compound is present in the exit gases. When these conditions are maintained, I find that the capacity of the catalyst to produce maleic anhydride is from four to ten times its maximum capacity in an ordinary tubular converter. Based on catalyst volume the throughput is about doubled.

My invention in its broadest aspects therefore relates to an improvement in the known vapor phase catalytic oxidation of mononuclear aromatic compounds to maleic anhydride, the improvement consisting in passing the vapors of these compounds in admixture with air or other oxidizing gas through a vanadium oxide-molybdenum oxide catalyst maintained in the form of a relatively narrow annulus and surrounded by a temperature-regulating liquid maintained at about 380°–450° C. With this improvement increased yields of maleic anhydride, greatly increased catalyst loadings and a much longer effective catalyst life are obtainable, for reasons which will be subsequently explained.

Figure 2:
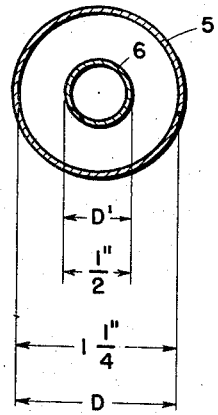

The invention will be further described and illustrated with reference to the accompanying drawing, wherein Fig. 1 is a vertical elevation, with parts broken away, of a single-tube catalytic converter embodying the principles of the invention, and Fig. 2 is a horizontal section on the line 2—2 of Fig. 1 showing the tube dimensions of the converter used in obtaining the results reported in the examples and also showing the optimum dimensions of tubes that may be used in a plant size, multi-tube converter.

Referring to Fig. 1 the converter indicated generally by reference numeral 1 is made up of a converter assembly 2 and a bath-recirculating assembly 3. The converter assembly 2 consists generally of an outer jacket 4 containing the bath liquid, a catalyst-containing tube 5 and a concentric core tube or rod 6 with equipment for mounting them in the proper operative relationship. The bath recirculating assembly 3 is made up of a vertical tube 7 having a horizontally extending lower portion 8 attached to the jacket 4 and an upper connecting tube 9 forming with the jacket a bath-recirculating system. Recirculation of the bath liquid may take place by thermosiphon flow or, as indicated in broken lines, a propeller 10 or other positive recirculating means may be supplied.

It will be understood that the converter shown on the drawing is a laboratory or pilot plant-sized apparatus and that a multi-tube converter would be used for commercial production. In the converter shown the jacket 4 is welded at its upper and lower ends to flanges 11 and 12; the catalyst tube 5 is welded adjacent its lower end to a matching flange 13 and is equipped internally with an annular screen or grid 14 for retaining the catalyst. At the upper end of the converter a flange 15 is provided carrying a collar 16 through which the catalyst tube 5 is adapted to pass; the flanges 15 and 11 are bolted together as are the flanges 12 and 13. The catalyst tube 5 terminates at its upper and lower ends in flanges 17 and 18 which are bolted to matching flanges 19 and 20 carrying packing nuts 21 and 22 which hold the core tube or rod 6 in place and prevent vapor leakage. Hollow screws 23 and 24 surround the upper and lower ends of the core tube and can be tightened against asbestos rope packing 25 to make a gas-tight connection.

In operation a suitable temperature-regulating liquid is filled into the jacket 4 and the recirculating system 3 to a level above the connecting tube 9 and vapors of a mononuclear aromatic compound such as benzene, toluene or a phenol in admixture with air are passed into the catalyst through the upper inlet tube 26. The vapor mixture passes downwardly through and in contact with the annular catalyst and is withdrawn through the lower outlet tube 27. In the laboratory tests described in the following examples the maleic anhydride was recovered by scrubbing the exit vapors with water and the yields were determined by titration and measuring the content of unconverted aromatic compound in the exit gases by means of an ultraviolet analyzer; in a full-scale commercial plant a similar water scrubber could be used or the gases could be scrubbed with an organic solvent for maleic anhydride.

The temperature-regulating liquid used in the converter shown on the drawing is a eutectic mixture of sodium nitrite and potassium nitrate which is sold commercially as a heat-transfer medium. It contains about 40% by weight of sodium nitrite and about 7% of sodium nitrate, the balance being substantially all potassium nitrate. It will be understood that a number of other heat transfer liquids such as metallic sodium, mercury, or mercury alloys and organic liquids such as the mixtures of diphenyl and diphenyl oxide sold commercially as "Dowtherm" and the like could be substituted for the molten salt mixture if desired.

The relative sizes of the tubes 5 and 6, which determine the size and thickness of the catalyst annulus, constitute an important feature of the invention, and these are shown on Fig. 2 of the drawing. The internal diameter of the tube 5 should be from 1" to 2½" and the diameter of the inner tube 6 should be such that the thickness of the catalyst annulus is from ⅜" to 1". In the particular converter used the dimensions were 1¼" for the outer tube and ½" for the inner tube, so that the catalyst annulus was ⅜" in thickness; its length was approximately 100 inches. Experiments carried out in this converter have shown repeatedly that increased yields of maleic anhydride vapors and greater catalyst loadings are obtainable when the core tube 6 is present even though the volume of catalyst in the tube is correspondingly reduced.

As has been stated, unusually good results have been obtained in this converter with catalysts which contain both oxides of vanadium and molybdenum oxide. Experience has shown, however, that for best performances a promoter such as silver, cerium or the like should also be present, and when carriers are used which do not themselves contain aluminum, such as with quartz or silicon carbide carriers, a minor proportion of aluminum oxide should also preferably be present. The vanadium is preferably incorporated into the catalyst as vanadium pentoxide, but it will be understood that this may be partially reduced to $V_2O_4$ during the oxidation reaction and therefore the active vanadium catalyst is probably a mixture of $V_2O_4$ and $V_2O_5$. The molybdic oxide ($MoO_3$) may also be partially or even completely reduced to $MoO_2$. In the present specification such mixtures are therefore defined simply as vanadium oxide and molybdenum oxide, it being understood that the actual state of oxidation of the vanadium and molybdenum will be determined by the catalyst loadings, the operating temperatures and the ratio of oxygen to aromatic compound vapors used in the process.

Optimum ratios of the catalyst ingredients are as follows. The ratio of molybdenum oxide to vanadium oxide in the freshly prepared catalyst corresponds to a weight ratio of $V_2O_5$ to $MoO_3$ of about 5:2, but may vary from 5:1 to about 5:3. The quantity of promoter ($Ag_2O$, $CeO$ or equivalent) may be from 5% to about 12% of the weight of the $V_2O_5$, but higher proportions should be avoided as they reduce the yields of maleic anhydride. If $Al_2O_3$ is present it is used in quantities of from 1% to about 10% on the weight of the $V_2O_5$, and preferably about 4%. The weight of the $V_2O_5$ in the finished catalyst, including the carrier, varies from about 5% to 20% or more, but experience has shown that no further improvements are obtained when it is above 20%. While any suitable carrier may be employed, such as quartz and other forms of silica, the best results are obtained with carriers of high heat conductivity such as silicon carbide, aluminum carbide and the like. I have found, surprisingly, that with silicon carbide carriers the presence of both molybdenum oxide and silver oxide or its equivalent, in the proportions outlined above, is essential when high maleic anhydride yields are desired; for example, a catalyst consisting only of $V_2O_5$ on grain silicon carbide produced yields of only 45 lbs. of maleic anhydride for each 100 lbs. of benzene charged, whereas yields of 75-80 lbs. were obtained with a catalyst containing the oxides of vanadium, molybdenum and silver.

In the annular catalyst beds of my invention the best results are obtained when the catalytic material is coated on a porous support, since the shape of the particles permits a decrease in the back pressure of the catalyst and thus permits increased catalyst loadings. I also believe the porous nature of the catalyst support contributes to the increased life of the catalyst. I have found that granular polysurface pellets of ceramically bonded and sintered silicon carbide are particularly good supports for catalysts maintained in the form of narrow annuli, and this constitutes another important feature of my invention. Such polysurface silicon carbide carriers ranging in average particle size from about ¼" to ½" diameter are available commercially. Typical carriers of this class are those described in Example 1 under the headings "Catalyst A" and "Catalyst B."

It is a particularly important advantage of my invention that, by maintaining the catalyst in the form of a narrow annulus, bath temperatures on the order of about 380°–450° C. and preferably about 400°–430° C. can be used, with corresponding reductions in the operating temperature of the catalyst itself, and that at these temperatures there is no loss of molybdenum from the catalyst. This has been shown by life tests in which molybdenum oxide catalysts in annular form were operated at 400°–430° C. bath temperatures for more than 500 hours with no losses in molybdenum oxide content whatsoever. One such test, which ran for 325 hours, is reported in Example 2, and at the end of this test the catalyst was analyzed for molybdenum oxide and found to contain the same quantity that was present in the catalyst when it was freshly prepared.

The mononuclear aromatic compounds most commonly used as raw materials in the commercial production of maleic anhydride are benzene, toluene and phenol. Coal tar cresols are also sometimes employed. While the principles of my invention are described and illustrated with reference to the oxidation of benzene, it will be understood that toluene or a phenol may also be used to advantage. The same ratio of air or other oxidizing gas to aromatic compound feed can be used; i.e., a mixture of from about 0.5 to 2 mole percent of toluene or phenol in air, and approximately the same catalyst loadings. It will be understood, therefore, that the passage of such mixtures through vanadium oxide-molybdenum oxide catalysts maintained in the annular form described above and in heat exchanging relation with a temperature-regulating liquid maintained at temperatures such as to reduce losses of molybdenum oxide by volatilization, preferably within the range of about 380°–450° C., is included within the scope of my invention.

The invention will be further described and illustrated by the following specific examples.

EXAMPLE 1

Catalyst preparation

Prepare the following solutions:

(a) Ammonium metavanadate, 27.0 grams in 750 ml. distilled water
(b) Ammonium molybdate (81–83% $MoO_3$), 10.3 grams
(c) Nitric acid, conc. (70% $HNO_3$), 68 ml. or 96.5 grams
(d) Aluminum nitrate ($Al(NO_3)_3 \cdot 9H_2O$), 5.9 grams in 50 ml. distilled water
(e) Silver nitrate, 4.1 grams in 50 ml. distilled water For a 5% coating use 380 grams of carrier; for heavier coatings reduce the weight of carrier accordingly. Prepare solution (a) by dissolving the ammonium metavanadate in 750 ml. of near-boiling water. Add the dry ammonium molybdate and agitate until the solution is clear and cool immediately to 15°–20° C. Add the nitric acid and solutions (d) and (e). Keep the resulting solution cool (15°–20° C.) during the coating operation.

Heat the carrier to 220° C. in a rotating pan and apply the coating solution by spraying while maintaining the carrier at 200°–250 C. When all of the solution has been applied the temperature of the catalyst is held at 275° C. until no further fumes are evolved.

Catalyst A

Granular polysurface pellets of ceramically bonded and sintered silicon carbide were coated as described above. The carrier was a commercial product made by mixing granules of silicon carbide with silica and alumina clay, pelleting, drying and firing in a kiln at temperatures above 1250° C. to convert the ceramic bond into a sintered or fused matrix around the granules. Its analysis and properties are as follows:

SiC_____ 80.30%.
$Al_2O_3$_____ 3.96%.
$SiO_2$_____ 13.80%.
CaO_____ 0.35%.
$K_2O$_____ 1.15%.
$Na_2O$_____ 0.35%.
MgO_____ 0.03%.
$Fe_2O_3$_____ 0.03%.
Porosity, percent_____ 40–50.
Apparent specific gravity_____ 1.9–2.4.
Bulk density_____ 1.6–1.8 lbs./c.f.
Average pore size, microns_____ 300–350.
Size_____ ¼ inch average diameter.

A catalyst containing 16% $V_2O_5$ was prepared by applying the above-described solution to this carrier, using one volume of this solution for each 95 grams of carrier. It contained 2.2% $Ag_2O$, 6.6% $MoO_3$ and 0.63% $Al_2O_3$.

Catalyst B

The carrier material was the same as in Catalyst A but was 2–4 mesh (½–¼ inch) with an average particle diameter of ⅜ inch. The same coating solution was applied; the catalyst contained 18% $V_2O_5$, 2.3% $Ag_2O$, 6.7% $MoO_3$ and 0.7% $Al_2O_3$.

Catalyst C

A 5% $V_2O_5$ coating was applied to a grain type silicon carbide composed of approximately ¼-inch plate-like grains. The coating composition and procedure were as described above. The catalyst contained 0.61% $Ag_2O$, 1.94% $MoO_3$, and 0.2% $Al_2O_3$.

Catalyst D

An 8.6% $V_2O_5$ coating was applied to the grain carborundum carrier of Catalyst C, using the composition described above.

Catalyst E

A 15% $V_2O_5$ coating was applied to the carrier of Catalyst B, using the coating solution described above.

EXAMPLE 2

A bath-type converter of the type shown on the drawing, having a catalyst tube 1.3 inches inside diameter, was used with and without the insertion of a concentric core one-half inch in outside diameter. In both cases the tube was charged with Catalyst A to a depth of 100 inches and benzene-air mixtures were passed downwardly while maintaining the operating conditions described below. The exit gases were scrubbed with water and the condensate was analyzed for maleic acid. Unoxidized benzene was determined in the scrubbed gas stream.

Table I (A) WITH CORE TUBE

| Bath Temp., ° C. | Benzene, Gr./Hr. | Air, Liters/Hr. | Contact Time, Sec. | Maleic Anhydride | |
|---|---|---|---|---|---|
| | | | | lbs./100 lbs. Benzene | On Converted Benzene, Wt. Percent |
| 385 | 100–160 | 3,000–4,000 | 0.9–1.1 | 65 | 70 |
| 400 | 100 | 3,000 | 1.1 | 70 | 72 |
| 420 | 230–480 | 6,000–12,000 | 0.45–0.62 | 66–70 | 72 |

(B) WITHOUT CORE TUBE

| 385 | 162–315 | 4,000–8,000 | 0.6–1.0 | 49–57 | 60–68 |
| 400 | 150–340 | 4,000–8,000 | 0.4–1.0 | 49–53 | 51–63 |

These results show that both higher loadings and higher yields of maleic anhydride are obtainable with a concentric core in the catalyst tube despite the fact that the volume of catalyst is much less.

The same converter, containing the core tube and the same catalyst, was operated with a bath temperature of 420° C., an input of 400 to 450 grams of benzene per hour and benzene-air ratios of 1.3 to 1.6 mole percent for 325 hours. The average yield over this run was 70 lbs.

of maleic anhydride per 100 lbs. of benzene charged, with from 7% to 10% of the benzene input recovered unchanged from the exit gases.

Another catalyst was prepared from the same polysurface silicon carbide carrier but with a coating of 30% $V_2O_5$, 4.3% $Ag_2O$ and 13% $MoO_3$ and tested in the same converter with the concentric core in place. The results were about the same as those given in Table I-(a), showing that doubling the quantity of catalytic material on the carrier does not result in a corresponding increase in performance of the catalyst.

When this converter, containing the same catalyst and core tube, was operated with a toluene-air mixture containing 1.2–1.5 mole percent of toluene, a feed rate of about 60 grams of toluene per hour and a bath temperature of 430° C. the yield of maleic anhydride was about 60–70 lbs. per 100 lbs. of feed.

EXAMPLE 3

Catalyst C was filled into the laboratory converter shown on the drawing and operated with a benzene-air mixture with the core in place. The operating conditions and the results obtained were as follows:

| Bath Temp., °C. | Hot Spot Temp., °C. | Benzene, gr./hr. | Contact Time, Sec. | Mole Percent Benzene | Maleic Anhydride, lbs./100 lbs. Feed | Unconverted Benzene, Percent |
|---|---|---|---|---|---|---|
| 415 | 550 | 400–450 | 0.5 | 1.3 | 70–75 | 5 |

EXAMPLE 4

Catalyst B was tested in the converter shown on the drawing, but without the core. A first series of runs was made (Series A) to determine the optimum operating temperature and then benzene concentrations in air in the range of 0.5–2.0 mole percent of benzene were studied at contact times of 1.75 seconds (Series B) and 1.20 seconds (Series C). The operating conditions and results of Series A were as follows:

| Bath Temp., °C. | Benzene, gr./hr. | Air, Liters/hr. | Contact Time, Sec. | Lbs. MAA per 100 lbs. Benzene |
|---|---|---|---|---|
| 415 | 120 | 2,800 | 1.27 | 75 |
| 430 | 200 | 4,000 | 0.9 | 70 |
| 450 | 125–200 | 3,000–4,000 | 0.9–1.1 | 65 |

In Series B and C the bath temperature was 415° C. and the benzene concentration (mole percent in air) and yields were as shown in the following table.

SERIES B

| Benzene Conc. | Lbs. MAA per 100 lbs. Benzene | Unconverted Benzene in Exit, Gas, Percent |
|---|---|---|
| 0.5 | 66 | 3–4 |
| 1.0 | 71 | 10–12 |
| 1.5 | 70 | 10 |
| 2.0 | 67 | 10 |

SERIES C

| | | |
|---|---|---|
| 0.5 | 65 | 20 |
| 1.2 | 68 | 21 |
| 2.0 | 66 | 15–20 |

These results confirm those of Examples 2 and 3 in showing that the vapor-phase air oxidation of a mononuclear aromatic compound such as benzene, toluene, phenol, cresols and the like to maleic anhydride can be carried out with high yields in the presence of a vanadium oxide catalyst on a silicon carbide carrier when this catalyst is activated by the presence of both silver and molybdenum oxide. Comparative tests carried out with catalysts prepared by spraying 5% of $V_2O_5$ on the carrier of catalyst C and on quartz granules of the same size, but with no promoter, using from 1.2 to 1.5 mole percent of benzene in air, a contact time of 1.2 seconds and bath temperatures of 415°–430° C. produced only low yields of maleic anhydride on the order of 45 lbs. per 100 lbs. of benzene charged.

EXAMPLE 5

The converter shown on the drawing, with the central core in place, was filled with catalyst C. In this catalyst the plate-like carrier grains, because of their size and shape, cause approximately the same pressure drop in the annulus as do the more porous polysurface pellets of catalyst A.

When the converter containing this catalyst was operated with benzene-air mixtures at benzene loadings of 400–450 grams per hour, bath temperatures of 400–430° C. and contact times as low as 0.5 second yields of 70 lbs. for each 100 lbs. of benzene charged were obtained. The results tabulated below, which were obtained with a bath temperature of 400° C., are representative.

| Benzene, Mole Percent | Air, Liters/Hr. | Contact Time, Sec. | Lbs. MAA | Unconverted Benzene, Percent | Percent MAA on Oxidized Benzene |
|---|---|---|---|---|---|
| 1.33–1.45 | 10,000 | 0.49 | 66–69 | 9.7–13 | 73–79 |
| 1.23–1.24 | 8,000 | 0.55 | 67–70 | 15 | 78–81 |
| 1.36 | 6,000 | 0.64 | 70 | 8.8 | 76 |
| 1.21 | 4,000 | 0.86 | 73 | 3.3 | 76 |
| 1.57 | 3,000 | 1.08 | 50 | None | 50 |

What I claim is:

1. In the vapor phase catalytic oxidation of mononuclear aromatic compounds to maleic anhydride by passing vapors thereof in admixture with an oxygen-containing gas through and in contact with a fixed-bed catalyst the improvement which comprises maintaining a bed of vanadium oxide-molybdenum oxide catalyst in the form of an annulus of from 1 to 2½ inches in outside diameter and a thickness of from ⅜ inch to one inch surrounded by and in heat-exchanging relation with a temperature-regulating liquid maintained at 380°–450° C. whereby increased catalyst loadings are obtainable without loss of molybdenum oxide from the catalyst by volatilization.

2. A method according to claim 1 in which the catalyst is a granular solid carrier of about 0.25–0.5 inch particle size coated with vanadium oxides, molybdenum oxide and silver oxide in proportions such that the vanadium oxide content corresponds to from 5% to about 20% of $V_2O_5$ on the weight of the catalyst and carrier, the molybdenum oxide content corresponds to a $V_2O_5:MoO_3$ ratio of from 5:3 to 5:1 and the silver oxide is from 5% to 12% of the weight of the $V_2O_5$.

3. A method of producing maleic anhydride vapors which comprises passing a mixture of vaporized benzene and air through and in contact with a bed of vanadium oxide-molybdenum oxide catalyst maintained in the form of an annulus of from 1 to 2½ inches in outside diameter and a thickness of from ⅜ inch to one inch surrounded by and in heat exchanging relation with a temperature-regulating liquid maintained at 380°–450° C. whereby increased catalyst loadings are obtainable without loss of molybdenum oxide from the catalyst by volatilization.

4. A method according to claim 3 in which the catalyst is a granular solid carrier of about 0.25–0.5 inch particle size coated with vanadium oxides, molybdenum oxide and silver oxide in proportions such that the vanadium oxide content corresponds to from 5% to about 20% of $V_2O_5$ on the weight of the catalyst and carrier, the molybdenum oxide content corresponds to a $V_2O_5:MoO_3$ ratio of from 5:3 to 5:1 and the silver oxide is from 5% to 12% of the weight of the $V_2O_5$.

5. A catalyst for the vapor phase oxidation of benzene to maleic anhydride comprising pellets of ceramically bonded silicon carbide coated with a mixture of vanadium oxides and molybdenum oxide promoted with minor quantities of aluminum oxide and silver oxide, the quantity of molybdenum oxide corresponding to a weight ratio of $V_2O_5$ to $MoO_3$ of from 5:1 to 5:3, the quantities of aluminum oxide and silver oxide being from 0.1% to about 1% and 5% to about 12%, respectively, on the weight of the vanadium oxides expressed as $V_2O_5$, and the quantity of vanadium oxides corresponding to from 5% to about 20% of $V_2O_5$ on the weight of the catalyst.

References Cited in the file of this patent
UNITED STATES PATENTS

| | | |
|---|---|---|
| 1,895,522 | Punnett | Jan. 31, 1933 |
| 2,120,538 | Andrews | June 14, 1938 |
| 2,206,377 | Weiss | July 2, 1940 |
| 2,489,347 | Rollman | Nov. 29, 1949 |
| 2,674,582 | Darby | Apr. 6, 1954 |